(12) United States Patent
Nguyen et al.

(10) Patent No.: US 11,392,394 B2
(45) Date of Patent: Jul. 19, 2022

(54) SYSTEMS AND METHODS FOR IN-APPLICATION DYNAMIC CONTENT LOADING

(71) Applicant: DraftKings, Inc., Boston, MA (US)

(72) Inventors: Jon Nguyen, Boston, MA (US); Daniel Kraus, Dedham, MA (US); Brian Tourtellott, Norwood, MA (US); Jason Rowe, South Hamilton, MA (US)

(73) Assignee: DraftKings, Inc., Boston, MA (US)

( * ) Notice: Subject to any disclaimer, the term of this patent is extended or adjusted under 35 U.S.C. 154(b) by 397 days.

(21) Appl. No.: 16/554,197

(22) Filed: Aug. 28, 2019

(65) Prior Publication Data

US 2021/0064391 A1    Mar. 4, 2021

(51) Int. Cl.
*G06F 16/955* (2019.01)
*G06F 9/445* (2018.01)

(52) U.S. Cl.
CPC ...... *G06F 9/44521* (2013.01); *G06F 16/9566* (2019.01)

(58) Field of Classification Search
CPC .................................................. G06F 16/9566
See application file for complete search history.

(56) References Cited

U.S. PATENT DOCUMENTS

| | | | | |
|---|---|---|---|---|
| 5,907,680 A | * | 5/1999 | Nielsen ............... | G06F 16/9566 709/228 |
| 2002/0085025 A1 | * | 7/2002 | Busis .................... | G06Q 30/06 715/738 |
| 2006/0112094 A1 | * | 5/2006 | Sullivan .............. | G06F 16/9566 |
| 2011/0289434 A1 | * | 11/2011 | Kieft ................... | H04L 63/1416 715/760 |
| 2012/0102221 A1 | | 4/2012 | Grieve | |
| 2014/0344345 A1 | | 11/2014 | Venkatraman et al. | |
| 2020/0167446 A1 | * | 5/2020 | Azulay ................. | G06F 40/14 |

FOREIGN PATENT DOCUMENTS

WO    WO-2017/123859 A1    7/2017

OTHER PUBLICATIONS

International Search Report and Written Opinion on International Appl. No. PCT/US2020/046129, dated Oct. 29, 2020.
International Preliminary Report on Patentability on PCT Appl. No. PCT/US2020/046129 dated Mar. 10, 2022.

* cited by examiner

*Primary Examiner* — Kris E Mackes
(74) *Attorney, Agent, or Firm* — Foley & Lardner LLP

(57) ABSTRACT

In some aspects, the disclosure is directed to methods and systems for in-application dynamic content loading via a hybrid process, including both local and remote content items, via a content handler intercepting requests in a predetermined uniform resource locator (URL) scheme and redirecting the requests to local storage or a remote content provider, transparently to a browser application or webview of the application, and avoiding restrictions imposed by an operating system of the device. Content may be dynamically updated on the content provider server by developers, and dynamically loaded during execution of the application on client devices, without requiring updates to be provided to an application store or publisher server.

20 Claims, 7 Drawing Sheets

SYSTEMS AND METHODS FOR IN-APPLICATION DYNAMIC CONTENT LOADING

FIELD OF THE DISCLOSURE

This disclosure generally relates to systems and methods for application delivery and execution. In particular, this disclosure relates to systems and methods for in-application dynamic loading of content from local and remote sources.

BACKGROUND OF THE DISCLOSURE

In various implementations, computing devices may access applications provided over a network, sometimes referred to as web applications, or may download applications for local execution. The latter may execute with lower latency (after the initial download) compared to the former; but the former may be dynamically updated by an application developer, allowing for a more varied user experience. For example, applications provided online may easily change images, fonts, styles, audio, video, or other assets quickly and dynamically as they are changed on a server hosting the application, while the same capability in downloaded applications requires updates and further downloads. These downloads may also be constrained by policies, such as those provided by an application store or publisher. For example, some application stores or publishers restrict the type of content that may be included in an update or download (e.g. executable code). Thus, developers may be restricted from offering applications with dynamically updating content.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
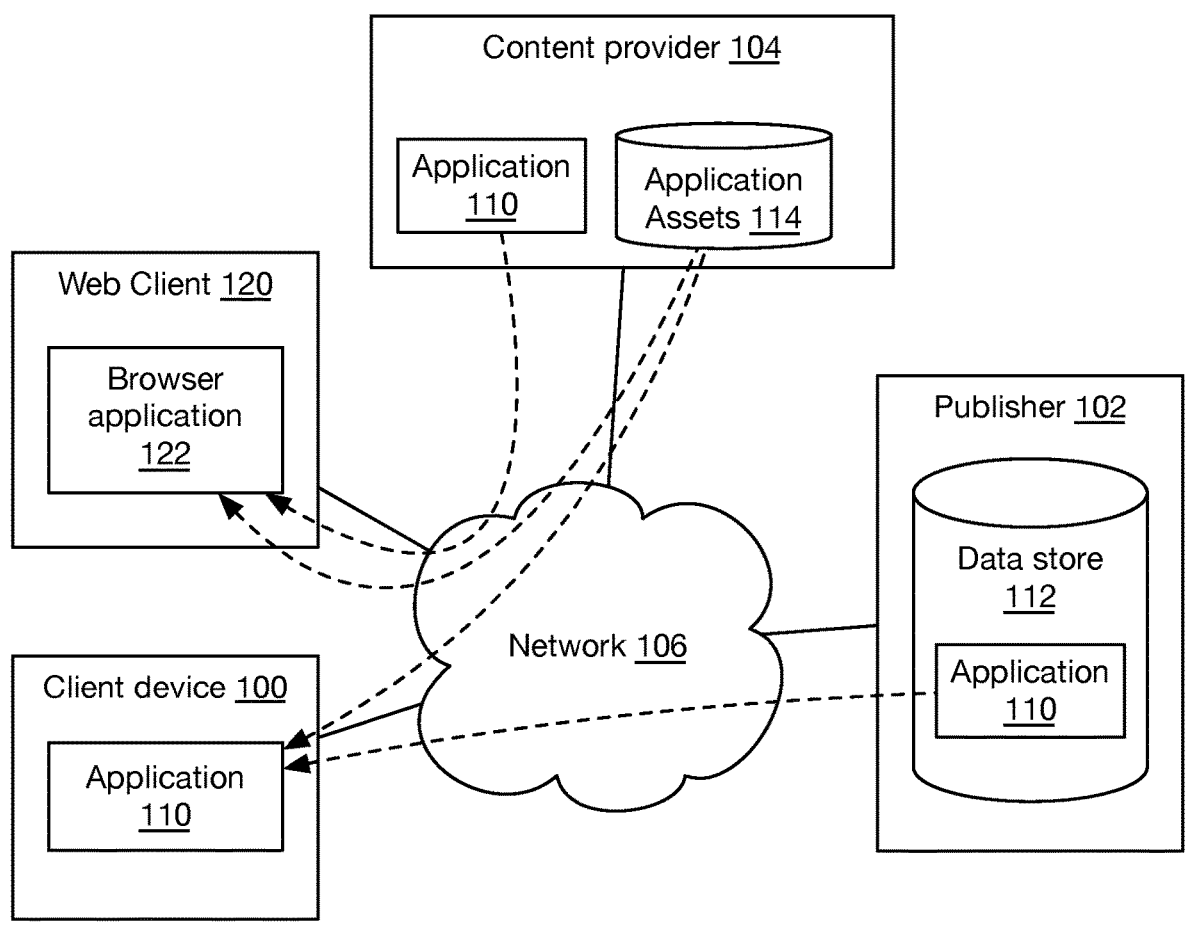
FIG. 1 is a block diagram of an implementation of a system for in-application dynamic content loading.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for in-application dynamic content loading; and Section B describes a network environment and computing environment which may be useful for practicing embodiments described herein.

A. In-Application Dynamic Content Loading

In various implementations, computing devices may access applications provided over a network, sometimes referred to as web applications, or may download applications for local execution. The latter may execute with lower latency (after the initial download) compared to the former; but the former may be dynamically updated by an application developer, allowing for a more varied user experience. For example, applications provided online may easily change images, fonts, styles, audio, video, or other assets quickly and dynamically as they are changed on a server hosting the application, while the same capability in downloaded applications requires updates and further downloads. Developers that wish to change content or application assets frequently may be restricted to providing web applications; however, this may result in reduced adoption or usage by users, particularly with the widespread use of mobile devices in which native applications are presented in a more accessible manner than web sites that require launching a browser application and navigating to a web application.

Downloaded applications may also be constrained by policies, such as those provided by an application store or publisher. For example, some application stores or publishers restrict the type of content that may be included in an update or download (e.g. executable code). At best, the publisher may require a review process before an update is made available to users, which may delay delivery by hours or days. This may be undesirable for quickly changing content (e.g. content based on current events, such as news or sports events), or for content updates that are related to particular dates or times (e.g. based on a particular holiday or other time-bounded event). At worst, the publisher may reject updates that include executable code, preventing the developer from providing the update.

Furthermore, separate from application stores or publishers, some operating systems may place restrictions on code executable by an application. For example, in some implementations, an operating system may prevent an application from retrieving data from multiple domains or network locations, to avoid cross-site scripting attacks or otherwise enhance privacy or security. Applications that access content locally may be blocked from accessing remote content by the operating system, resulting in impaired functionality or application stalls or crashes.

Additionally, even if developers use updates through a publisher or application store, users may be forced to download the update prior to execution of the application (or as a first step after launching the application), delaying the user from using the application. If the update is very large in size, or the device's network connection has limited bandwidth, this delay may be substantial, on the order of several minutes or longer. Thus, for all of the above reasons, developers may be restricted from offering applications with dynamically updating content.

Instead, the systems and methods discussed herein provide for dynamic loading of content in-application, as each item of content is utilized. This may avoid operating system and publisher or application store obstructions on the content or types of updates, and may provide a seamless and responsive experience for users, without waiting for downloading of large updates.

In some implementations, a first portion of application related data or files may be downloaded or provided to the user device in advance or embedded as part of an application bundle. The first portion may include executable code or logic for the application, and may be periodically updated (and potentially provided via an application store or publisher's normal update system). The first portion of application related data or files may also include a content handler that may intercept requests of the application for a second portion of application related data or files, comprising assets or contents for use in the application (e.g. images, styles, audio, fonts, video, or executable code). The content handler may redirect requests to a remote data store or content provider to retrieve the requested data or files as each request is processed. The application developer may freely update versions of the second portion of application related data or files stored on the remote data store or content provider, which may then be utilized in the application without formally updating the application.

For example, in one such implementation in which the application comprises a mobile game, resources such as game logic files (e.g. JavaScript or other executable code) and/or HTML markup code may be embedded in an application bundle provided by an application store or publisher. After downloading and executing the application on a client or user device, a browser application or web view may be instantiated to load and render the logic files or markup code of the application bundle. The device may also instantiate a content handler to intercept requests from the browser application or web view for in-application or in-game assets and rewrite responses to avoid operating system limitations or other restrictions. Assets that are in local storage of the client or user device may be loaded directly, while assets that are not present may be requested by the content handler from a server or content provider. Thus, content may be loaded in a hybrid fashion in which some content is embedded in the application and some content is retrieved remotely. This is unlike typical browser applications or web views, which may be restricted (e.g. by an operating system of the device) to only loading locally stored content embedded in the application, or to only loading remotely stored content from a content provider. Advantageously, the same underlying code (e.g. HTML code, JavaScript, etc.) may be used for both hybrid-loading applications executed in a web view or browser application on a client device as well as for providing a web application (albeit without the content handler intercepting and rewriting requests and responses, in many implementations). The underlying code in the first portion of the application may also perform other functionality or use capabilities of the operating system, such as user authentication, geolocation verification, user interface monitoring or interaction detection (e.g. taps, gestures, etc.), or other such features.

FIG. 1 is a block diagram of an implementation of a system for in-application dynamic content loading. A client device 100 may download and install an application 110 provided by a publisher device 102 via a network 106. Client device 100 may comprise any type and form of computing device operating on behalf of or under control of a user, such as a mobile device, tablet device, smart phone, wearable device, embedded device, Internet-of-Things (IoT) device, or other such device. As discussed in more detail below, the client device 100 may comprise processor circuitry for executing an application 110, a memory device or other storage device for storing application 110 for execution as well as assets or content retrieved for use by application 110, a network interface for communicating via one or more networks 106, and/or one or more input/output interfaces, such as a touchscreen, monitor, joystick, keyboard, mouse, or other such interface hardware, as well as combinations of this or other hardware. Although only a single client device 100 is illustrated for clarity, in many implementations, many thousands or millions of client devices 100 may be present in the system.

Publisher 102 may comprise any type and form of server computing device provided by or operating on behalf of a publisher or application store provider, such as an application store or software repository. Publisher 102 may comprise one or more desktop computers, server computers, rackmount computers, or other physical computers, and may be deployed as a server farm or cloud of virtual computers executed by one or more physical computing devices. Publisher 102 may comprise a memory device or data store 112, which may be internal to publisher 102 and/or provided by an external device (e.g. network storage device, or other such device, including virtual storage devices provided by one or more physical computing devices). Data store 112 may store one or more applications 110 for downloading and installation by client devices 100, and may store the applications 110 in a compressed data format in many implementations. Publisher 102 may include an authentication or payment system or other such interfaces to allow users to purchase applications for download. In many implementations, application updates may be provided by publisher 102 (e.g. after upload by developers and, potentially, review by the publisher or application store provider to ensure compliance with usage or delivery policies). Updates may be provided in a similar manner, e.g. as compressed data files or differential change files from a prior version of the application, for download and installation by client device(s) 100.

Network 106 may comprise a local area network (LAN), wide area network (WAN) such as the Internet, satellite network, cellular network, broadband network, or any combination of these or other networks. Network 106 may comprise many individual devices, such as gateways, switches, hubs, firewalls, access points, network accelerators, or other such devices (not illustrated).

Application 110 may comprise any type and form of application, including a productivity or "office" application, a media application, a social networking application, a game application, or any other such application, and may comprise a first portion of executable code or logic provided within the application bundle, a content handler for execution by the application or client device for intercepting and handling requests for additional content, and a second portion of assets or content for use by the application. As discussed above, some of the second portion or assets may be embedded in the application bundle retrieved from the publisher 102 and/or stored locally on the client device 100, and/or some or all of the second portion or assets may be stored remotely, e.g. as application assets 114 on a content provider 104, for retrieval via the content handler and use within the application 110. The second portion or assets may comprise any type and form of data, including images, fonts, styles, audio, video, or executable code or rules for use by the executable code or logic of the first portion of the application.

Content provider 104 may comprise any type and form of server computing device provided by or operating on behalf of a content provider or application developer, such as a web server, asset server, file server, database server, or other such data server device. Content provider 104 may comprise one or more desktop computers, server computers, rackmount computers, or other physical computers, and may be deployed as a server farm or cloud of virtual computers executed by one or more physical computing devices. Content provider 104 may store application assets 114 in an internal or external storage device (e.g. network storage device, or other such device, including virtual storage devices provided by one or more physical computing devices) for retrieval by a content handler of an application 110 via a network 106.

As discussed above, in many implementations, application 110 and assets 114 may be provided as a web application, e.g. to a web client 120, without modification to the underlying executable code of the application. Web client 120 may comprise any type and form of computing device (including a client device 100) accessing the application 110 as a web application or hosted application (e.g. Software-as-a-Service (SaaS) application).

Figure 2A:
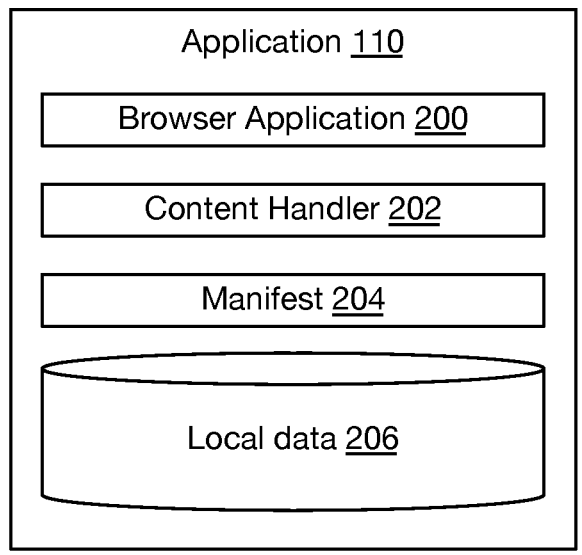
FIG. 2A is a block diagram of an implementation of an application configured for in-application dynamic content loading.

FIG. 2A is a block diagram of an implementation of an application 110 configured for in-application dynamic content loading. Application 110 may comprise, execute, or instantiate a browser application 200, such as a webview or browser application bundled within application 110 or provided by an operating system of the device and presented within application 110. Browser application 200 may render or execute executable code stored in local data 206 of the application, such as HTML or JavaScript code or other web technologies.

Application 110 may also comprise a content handler 202. Content handler 202 may comprise an application, service, server, daemon, routine, or other executable logic for intercepting and processing requests generated by browser application 200 during execution of the application code in local data 206. Content handler 202 may intercept requests at any level of a network stack, such as at the application layer, session or presentation layer, or lower layers (e.g. transport or network layer). Content handler 202 may intercept or hook network requests generated by the browser application 200 prior to transmission of the requests by a network interface of the client device. In some implementations, content handler 202 may be configured to intercept a subset or portion of requests generated by the browser application, such as requests having a predetermined uniform resource locator (URL) scheme, such as custom:// or application:// or any other similar scheme. This may allow the browser application and client device to perform other requests utilizing different schemes (e.g. http://, ftp://) without interception or processing by the content handler 202. For example, in one such implementation, application 110 may instantiate a webview to load the application code, and may be configured with a URL scheme handler for a custom or predetermined URL scheme. The content handler may then intercept subsequent requests of the browser application with the custom or predetermined URL scheme for processing. The custom or predetermined URL scheme may be one that is unknown to or not supported by the browser application and/or operating system of the client device, and or cannot be processed natively by the browser application and/or operating system of the client device. Accordingly, use of such custom or predetermined URL schemes may avoid security or sandboxing protocols applied by the browser application and/or operating system of the client device to standard URL schemes such as http:// or ftp://.

In some implementations, application 110 may comprise a manifest 204 or list or identification of files stored locally at the client device (e.g. in local data 206, or elsewhere in a memory device of the client device, such as a session cache that is cleared upon termination of application 110. Manifest 204 may comprise a flat file, data file, array, or any other type and form of data structure, and may list files and/or storage locations of content for application 110. In some implementations, after intercepting a request from browser application 200, content handler 202 may check the manifest 204 to determine if the file is stored or accessible locally. If so, the file may be retrieved by the content handler 202 and provided to the browser application. If the file is not available locally or not identified in the manifest 204, the content handler may retrieve the file from a remote content provider.

In many implementations, requests for data or files from the browser application 200 that are fulfilled via local files or remote files may be essentially identical or indistinguishable (other than the specific file identified). That is, the requests may have similar methods (e.g. HTTP or FTP GET requests, remote procedure calls, etc.), similar headers, and may use the same URL scheme (e.g. "custom://" or a similar predetermined URL scheme). This allows the same code to be used in web applications (where all files may be considered "remote"), and also avoids operating system restrictions that disallow requests of a given scheme to be provided to different domains during a session. The content handler 202 may intercept all such requests and determine whether to redirect the request to a local file (e.g. retrieving the file via operating system read operations) or to a remote server (e.g. via transmission of a request via a network).

Figure 2B:
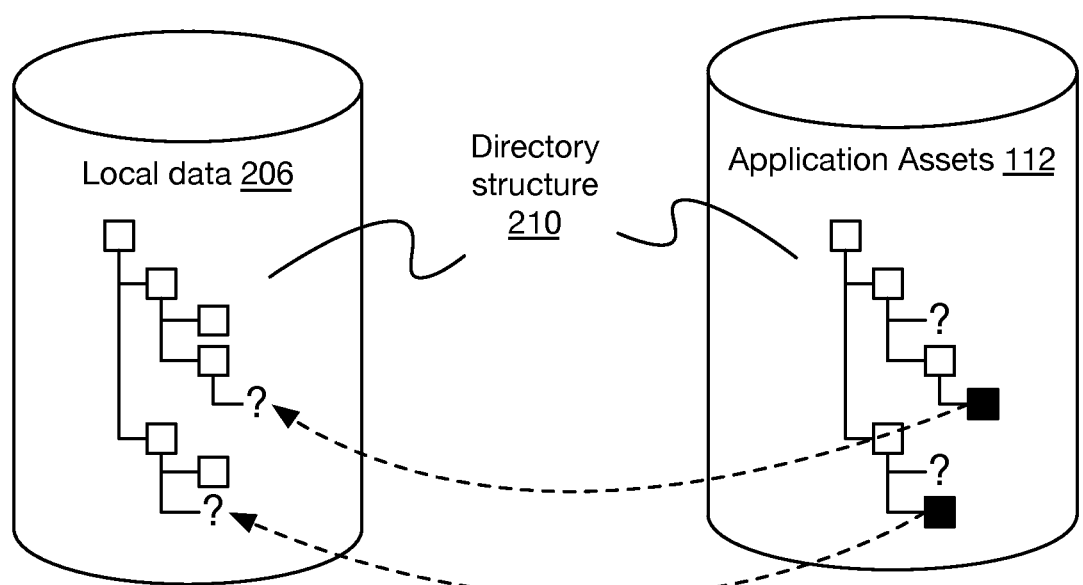
FIG. 2B is an illustration of a local data storage of an application and a remote application asset storage, according to some implementations.

In some implementations, the content handler 202 may determine whether to redirect the request to a local file as opposed to a remote server by consulting manifest 204 to determine if the requested file exists in local storage. As discussed above, the manifest may list or identify files stored locally. In other implementations, the content handler 202 may search a directory structure of the storage device and/or of the application 110 (e.g. local data 206) to identify whether the file exists in local storage. For example, FIG. 2B is an illustration of a local data storage 206 of an application, according to some implementations. Files may be stored in a folder-based or tree-based directory structure, in some implementations, with each file having a storage location corresponding to a URL of the file. For example, a file (e.g. "coin.jpg") may be stored within a folder titled "main", which may be stored within a folder titled "game", thus resulting in a (partial) URL of "main/game/coin.jpg". In some implementations, the assets may be stored in a folder within local storage titled with a domain name of a content provider (e.g. "example.com"), such that a fully realized URL may represent the file location (e.g. "example.com/main/game/coin.jpg". Advantageously, this may allow for remote files to be stored in a corresponding folder structure in application assets 112 of a remote application asset storage at a content provider 104.

For example, as shown in FIG. 2B, application asset storage 112 provided by a content provider may store assets (identified with black squares) at locations in a folder-based directory corresponding to the locations at which they are requested by browser application 200 from local storage (identified with question marks). A single URL referenced by code of the application 110 (e.g. "example.com/main/game/coin.jpg" may thus represent a location in local data storage 206 of the application 110, as well as a corresponding location in a remote data store of application assets 112. Content handler may thus redirect the request based on the presence or absence of the file in local data storage, without having to rewrite or modify the URL. This also allows the same executable code to be utilized for a web application without requiring any rewriting or modification (e.g. a web client may load a web page that includes an embedded image with an address of "example.com/main/game/coin.jpg", and may retrieve the image from the address via a network; and a mobile client executing application 110 may similarly load a page from local data 206 that includes an embedded image with an address of "example.com/main/game/coin.jpg", and content handler 202 may redirect the request to local data 206 or remote application assets 112 depending on whether or not the file is found locally).

As discussed above, application assets may use a customized or predetermined URL scheme to allow content handler 202 to intercept requests for the asset, and to avoid cross-site or cross-domain restrictions or other restrictions from an operating system of the device. For example, executable code of the application 110 may include a URL scheme with the address of the asset, such as "custom://example.com/main/game/coin.jpg". Requests using the "custom" scheme or a corresponding predetermined scheme may thus be intercepted and processed by the content handler 202.

Although used by the content handler 202, the first predetermined scheme (e.g. "custom") may be inappropriate for requesting remote resources. For example, a remote web server providing application assets 112 may use a second predetermined scheme and corresponding application layer protocol such as http or https. To provide a compliant request, the content handler 202 may modify the URL scheme of the request after determining that the requested data or file does not exist in local data 206 of the application 110. For example, the content handler 202 may intercept a request of "GET custom://example.com/main/game/coin.jpg" and, upon determining that the requested asset does not exist in local data storage, may rewrite the request as "GET https://example.com/main/game/coin.jpg." The content handler 202 may then transmit the request to a content provider for retrieval of the requested asset. In some implementations, upon receipt of the asset, the content handler may generate a response using the first predetermined scheme (e.g. via a urlSchemeTask's DidReceiveData method, in some implementations). As discussed above, in some implementations, the content handler may also add the asset to a local manifest and/or may store the asset in local data storage. In some such implementations, the asset may be tagged or otherwise identified as non-cacheable, and in a further implementation, the asset (and any reference in a manifest) may be removed upon termination of the application or at the end of a session.

Figure 3:
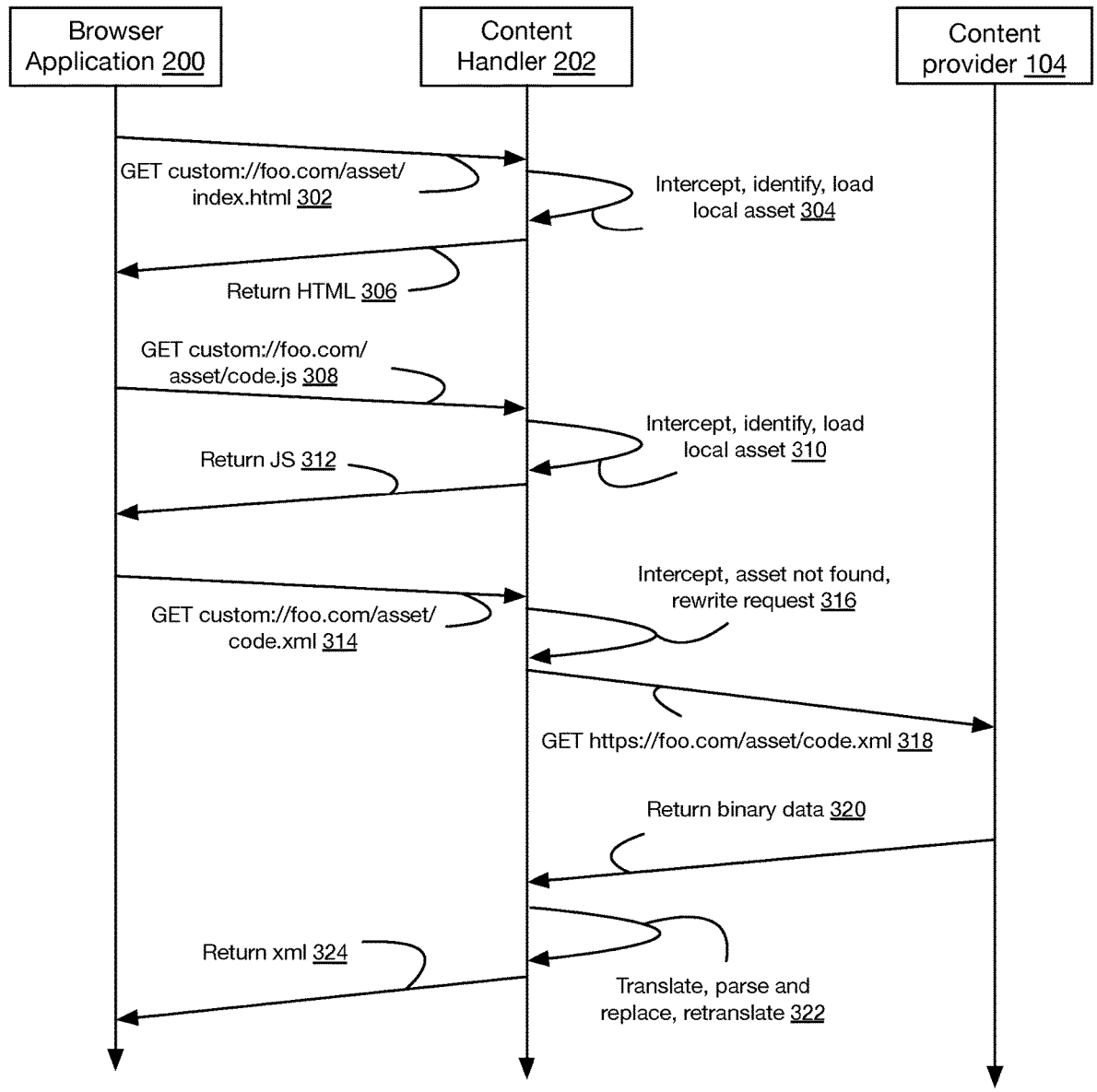
FIG. 3 is a signal flow diagram of an implementation of in-application dynamic content loading.

FIG. 3 is a signal flow diagram of an implementation of in-application dynamic content loading. At step 302, a browser application 200 may request an asset or file via a URL and predetermined URL scheme (e.g. "custom"). The URL may have a first portion representing a domain (e.g. foo.com) and a second portion representing an address within a directory structure at the domain (e.g. /asset/index.html). At step 304, a content handler 202 may intercept the request, responsive to the use of the predetermined URL scheme. The content handler 202 may identify that the asset or file in the request exists in local storage of the application or device (e.g. via a manifest or by attempting to retrieve or search for the file at that location), and may retrieve the asset or file. At step 306, the content handler 202 may return the requested asset or file to the browser application, e.g. via a scheme method as discussed above.

In many implementations, the initial asset or file of the application may reference additional files or assets. Upon rendering or executing the initial asset, the browser application may generate further requests, such as the second request at step 308. As with the first request above, the content handler may intercept the request at step 310, identify the corresponding local asset, and may retrieve the asset from local storage. The content handler may then return the requested asset or file at step 312 as discussed above.

The browser application may also request assets or files that may not exist in local storage. For example, at step 314, the browser application may request a file, and at step 316, the content handler may determine that the file does not exist (e.g. via the manifest or by searching the directory structure at the indicated address). The content handler may rewrite the request or generate a second request by replacing the first predetermined URL scheme with a second predetermined URL scheme used by a content provider. The content handler may forward the modified request or transmit the second request via a network interface of the device via a network to a server at the domain identified in the first portion of the URL.

In some implementations, the content provider 104 may provide the requested asset as binary data (e.g. in the payload of an http or https packet or packets), as at step 320. In some implementations, such as if the asset includes further embedded content or URLs of such content, such as additional executable code identifying further content, the asset may include URLs having the second predetermined URL scheme (e.g. "https://") rather than the first predetermined URL scheme (e.g. "custom://"). If the content is provided to the browser application and executed, the browser application may generate further requests using the incorrect URL scheme, which may bypass the content handler and may potentially result in errors or be blocked by an operating system of the device. Accordingly, in some implementations, the content handler may parse the content item for such URL schemes and replace them with the predetermined URL scheme. This may be done in some implementations by translating or converting the content from binary data to an alphanumeric string (e.g. ASCII data), searching for and replacing URL schemes (e.g. via a regex), and re-translating the modified string back to binary data, as at step 322. The modified binary data may then be provided to the browser application at step 324, as discussed above.

Figure 4:
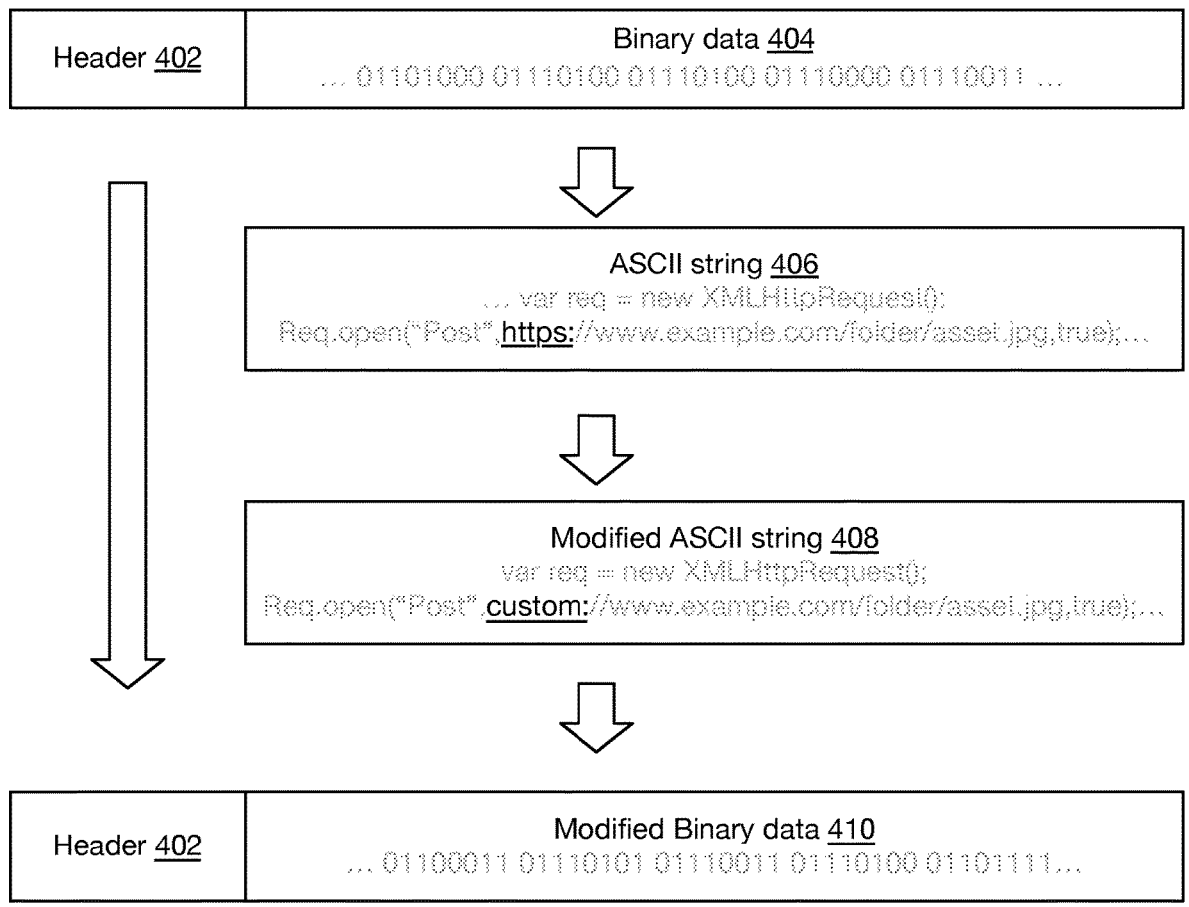
FIG. 4 is an illustration of a process of translating and parsing content for in-application loading, according to some implementations.

Referring to step 322 in more detail, FIG. 4 is an illustration of a process of translating and parsing content for in-application loading, according to some implementations. An asset or content item received from a content provider server may comprise a header 402 and payload comprising binary data 404. The content handler may translate the payload into a data string, such as ASCII data 406. The content handler may modify the string to replace one or more URL schemes in URL addresses with a predetermined or custom URL scheme to generate a modified string 408. The content handler may translate the string back to binary data (e.g. modified binary data 410). The header may be reattached to the payload, and the modified content may be provided to the browser application.

Figure 5:
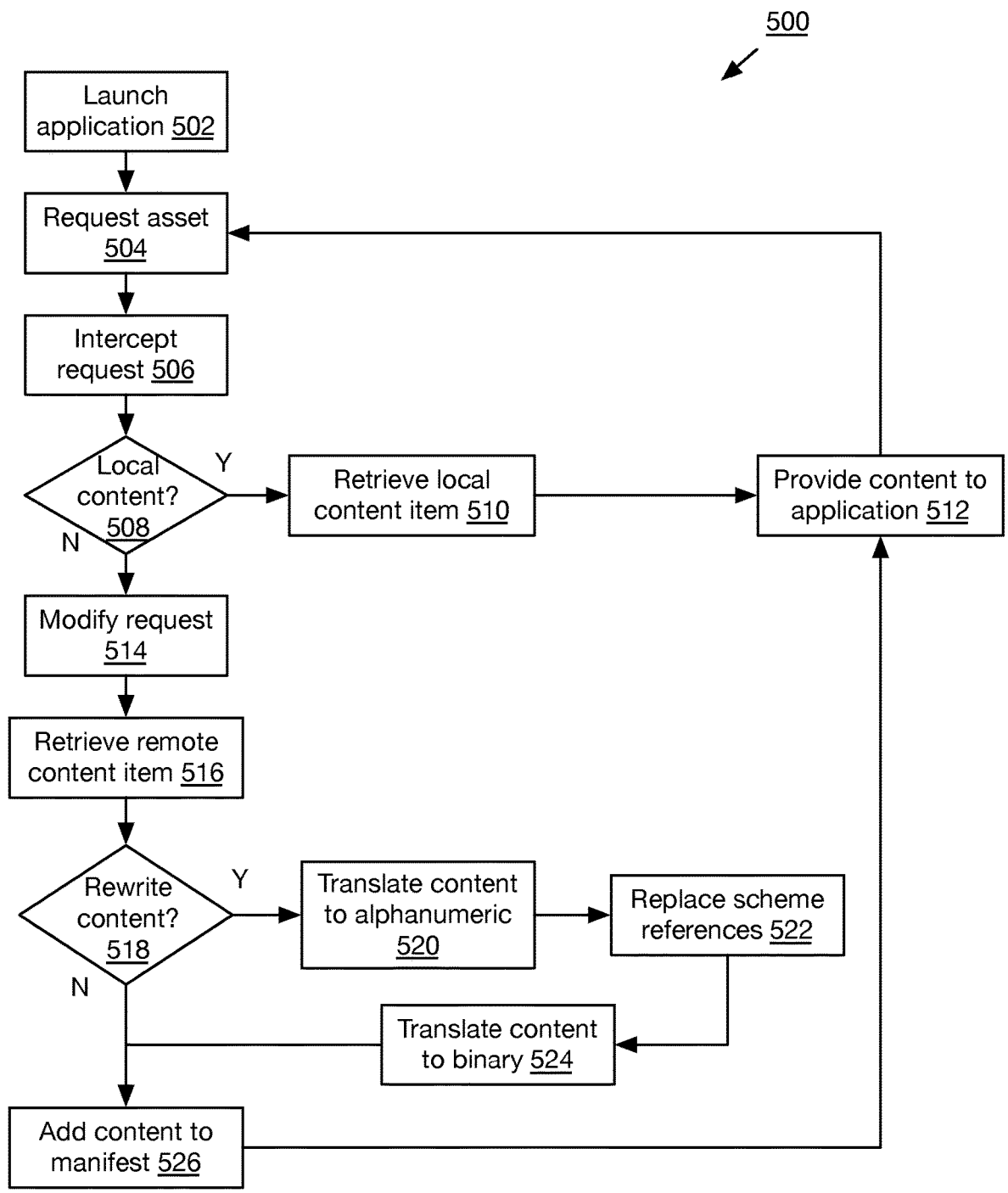
FIG. 5 is a flow chart of an implementation of a method for in-application dynamic content loading.

FIG. 5 is a flow chart of an implementation of a method 500 for in-application dynamic content loading. At step 502, in some implementations, a computing device may launch or instantiate an application. The application may comprise or instantiate a browser application or webview, and may execute a content handler. Executing the content handler may comprise registering a URL scheme for interception by the content handler with an operating system of the device and/or the webview or browser application. The application may comprise one or more local assets or content items, which may be organized in a directory structure. Executable code of the application may reference one or more additional content items or assets, not present in storage of the computing device or application, at addresses or locations in remote storage of a content provider corresponding to the directory structure. The application may also comprise a manifest of content items or local assets.

At step 504, the browser application may request an asset or content item. This may be done as an initial loading of content for the application, or in response to rendering or executing code of an initial or starting page (as well as for later requests, when step 504 is repeated). The request may include a predetermined URL scheme registered for interception by the content handler, and an address of content within the directory structure. The request may be provided by the application to a network stack or operating system of the computing device.

At step 506, the content handler may intercept the request responsive to the request having the predetermined URL scheme (or the operating system or network stack of the device may redirect the request to the content handler, responsive to the request having the predetermined URL scheme). Intercepting the request may comprise reading the request from memory, such as a transmission buffer or buffer of a network stack or output buffer of the browser application or webview.

At step 508, the content handler may determine if the requested asset or content item exists in local storage (e.g. in a local data store of the application or computing device). In some implementations, the content handler may consult a manifest of the application to determine if the asset or content item is included in the manifest, or in some implementations, the content handler may search a directory structure of local storage for the asset or content item at an address or location corresponding to the URL of the request (or may attempt to retrieve the item from the address or location identified in the URL, with success indicating the item is present and failure indicating the item is not present).

If the asset or content item exists in local storage, then at step 510, the content handler may retrieve the asset or content item from storage, and at step 512 may provide the content item or asset to the browser application for rendering or execution. Providing the content item or asset may comprise streaming the content as an HTTP response or similar application layer response to the application browser, as if received from a remote server without interception by the content handler. The content handler may add a content length header comprising an identification of the size of the content item, and/or may generate a content type header with an appropriate Multipurpose Internet Mail Extension (MIME) type identifier (e.g. image/jpeg for a .jpg content item). The browser application may receive the content item and may render and process the item as if received from a remote server, with the content handler acting transparently to the browser application.

If the asset or content item is not available in local storage, then at step 514 in some implementations, the content handler may modify the request or generate a new request. The content handler may replace a first predetermined URL scheme of the request with a second URL scheme for a request to a remote content provider. The second URL scheme may be predetermined or may always use the same URL scheme (e.g. https://), or in some implementations, the second URL scheme may be selected based on the URL in some implementations (for example, a URL scheme of http:// or https:// may be selected if the URL begins with "www" such as "www.example.com", while a URL scheme of ftp:// may be selected if the URL begins with "ftp", such as "ftp.example.com").

At step 516, the content handler may retrieve the content item or asset from a remote content provider, by transmitting the modified or regenerated request to the content provider via a network interface of the computing device. In one such implementation, the content handler may intercept the request at the application layer of the network stack of the device, modify the URL scheme, and pass the request to a lower layer of the network stack. In another implementation, the content handler may direct an operating system of the device to generate a new request with the second URL scheme and transmit the request via the network stack of the device. The content handler may receive a response from the content provider comprising the requested asset or content item.

In some implementations, at step 518, the content handler may determine whether to translate and parse the received content item for embedded URLs having an incorrect URL scheme or not including the first predetermined or custom URL scheme. In some implementations, the content handler may translate and parse all received content items (with content items having no embedded URLs translated and parsed, but with no strings replaced; while content items with embedded URLs are translated and parsed with URL scheme strings replaced as discussed above). In other implementations, the content handler may determine whether to translate and parse the content item, such as based on a type of content item (e.g. with executable code such as JavaScript or HTML data or similar data being translated and parsed, while non-executable data such as images or audio is left untranslated).

If the content item or asset is to be translated and parsed, at step 520, the content handler may translate the content item or asset from binary data into an alphanumeric string (e.g. ASCII data). At step 522, the content handler may perform a string replace or regex search and replace to replace any URL schemes within the string with the predetermined or custom URL scheme (e.g. replacing "https://" with "custom://" or a similar scheme), generating a modified data string. At step 524, the content handler may translate the modified data string back to binary data, resulting in modified binary data of the content item. The content item may then be provided to the browser application (along with an appropriate application layer header in some implementations, such as an http header comprising a content length identifier and content type identifier, or similar header data) at step 512. In some implementations, the content item may be stored locally in local data of the application or elsewhere in memory of the computing device. In a further implementation, an identifier of the content item may be added to a manifest of the application at step 526, such that the content handler may identify the content item as being stored locally at step 508 on subsequent requests for the content item. In some implementations, the manifest may be cleared or added entries removed and retrieved content items may be removed or purged from local storage on termination of the application session, browser application, or webview.

Accordingly, content items may be loaded for an application via a hybrid process, including both local and remote content items, via a content handler intercepting requests in a predetermined URL scheme and redirecting the requests to local storage or a remote content provider, transparently to a browser application or webview of the application, and avoiding restrictions imposed by an operating system of the device. Content may be dynamically updated on the content provider server by developers, and dynamically loaded during execution of the application on client devices, without requiring updates to be provided to an application store or publisher server.

In some aspects, the present disclosure is directed to a method for in-application dynamic content loading. The method includes executing, by a computing device, an application comprising a browser application and a content handler. The method also includes intercepting, by the content handler, a first request from the browser application to retrieve an item of content via a uniform resource locator (URL) having a domain portion and a directory portion, responsive to the first request having a first predetermined URL scheme. The method also includes determining, by the content handler, that a content item does not exist at a location in memory of the computing device corresponding to the directory portion of the URL. The method also includes replacing, by the content handler, the first predetermined URL scheme in the first request from the browser application with a second predetermined URL scheme, responsive to the determination that the content item does not exist at the location in memory of the computing device corresponding to the directory portion of the URL. The method also includes transmitting, by the computing device, a second request to a remote device corresponding to the domain portion of the first request, the second request comprising the modified first request. The method also includes receiving, by the computing device from the remote device, the item of content.

In some implementations, the method includes translating, by the content handler, binary data of the received item of content into a data string; replacing, by the content handler, each of one or more references to the second predetermined URL scheme within the data string with references to the first predetermined URL scheme to generate a modified data string; translating, by the content handler, the modified data string into modified binary data; and providing, by the content handler, the modified binary data to the browser application for rendering. In a further implementation, replacing each of one or more references to the second predetermined URL scheme with the data string includes replacing a plurality of references to the second predetermined URL scheme with references to the first predetermined URL scheme. In another further implementation, the item of content comprises executable code. In yet another further implementation, providing the modified binary data to the browser application for rendering includes generating a response to the first request comprising the modified binary data.

In some implementations, determining that the content item does not exist at the location in memory of the computing device includes determining that the content item is not identified in a manifest of the application. In a further implementation, the method includes extracting data from a header from the received item of content, and adding the extracted data to the manifest of the application.

In some implementations, the item of content is identified as non-cacheable. In some implementations, an operating system of the computing device prevents transmission of requests from the application having the second predetermined URL scheme, responsive to transmission of the first request having the first predetermined URL scheme. In some implementations, determining that the content item does not exist at the location in memory of the computing device includes identifying a type of the content item; and determining that a manifest of the application does not identify the type of the content item.

In another aspect, the present disclosure is directed to a system for in-application dynamic content loading. The system includes a computing device comprising a processor, a network interface, and a memory device, the processor executing an application comprising a browser application and a content handler. The content handler is configured to: intercept a first request from the browser application to retrieve an item of content via a uniform resource locator (URL) having a domain portion and a directory portion, responsive to the first request having a first predetermined URL scheme; determine that a content item does not exist at a location in the memory device corresponding to the directory portion of the URL; and replace the first predetermined URL scheme in the first request from the browser application with a second predetermined URL scheme, responsive to the determination that the content item does not exist at the location in the memory device corresponding to the directory portion of the URL. The network interface is configured to: transmit a second request to a remote device corresponding to the domain portion of the first request, the second request comprising the modified first request, and receive, from the remote device, the item of content.

In some implementations, the content handler is further configured to: translate binary data of the received item of content into a data string; replace each of one or more references to the second predetermined URL scheme within the data string with references to the first predetermined URL scheme to generate a modified data string; translate the modified data string into modified binary data; and provide the modified binary data to the browser application for rendering. In a further implementation, the content handler is further configured to replace a plurality of references to the second predetermined URL scheme with references to the first predetermined URL scheme. In another further implementation, the item of content comprises executable code. In still another further implementation, the content handler is further configured to generate a response to the first request comprising the modified binary data.

In some implementations, the content handler is further configured to determine that the content item is not identified in a manifest of the application. In a further implementation, the content handler is further configured to extract data from a header from the received item of content, and add the extracted data to the manifest of the application.

In some implementations, the item of content is identified as non-cacheable. In some implementations, an operating system of the computing device prevents transmission of requests from the application having the second predetermined URL scheme, responsive to transmission of the first request having the first predetermined URL scheme. In some implementations, the content handler is further configured to identify a type of the content item; and determine that a manifest of the application does not identify the type of the content item.

B. Computing and Network Environment

Having discussed specific embodiments of the present solution, it may be helpful to describe aspects of the operating environment as well as associated system components (e.g., hardware elements) in connection with the methods and systems described herein.

Figure 6A:
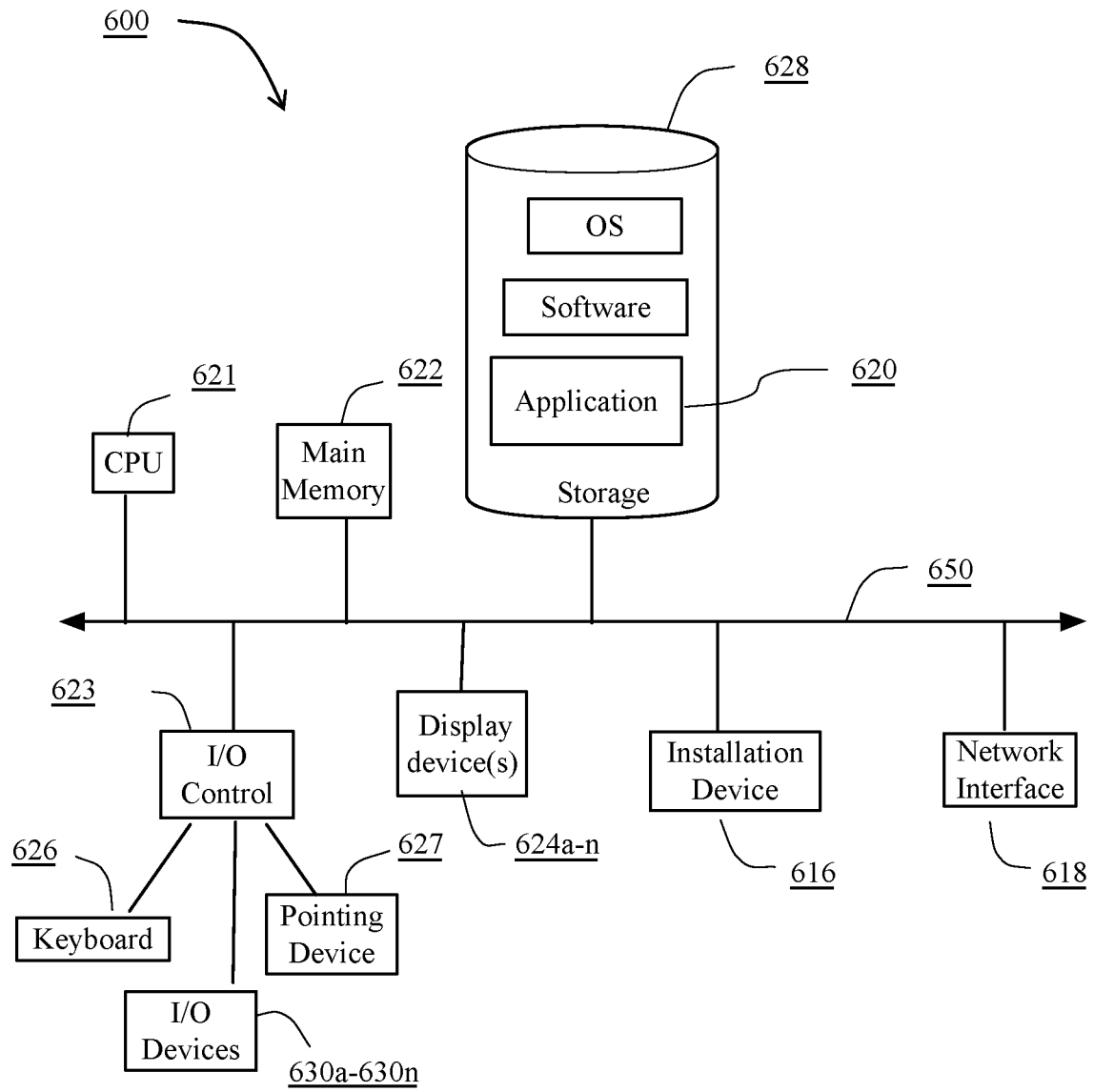
FIGS. 6A and 6B are block diagrams depicting embodiments of computing devices useful in connection with the methods and systems described herein.
Figure 6B:
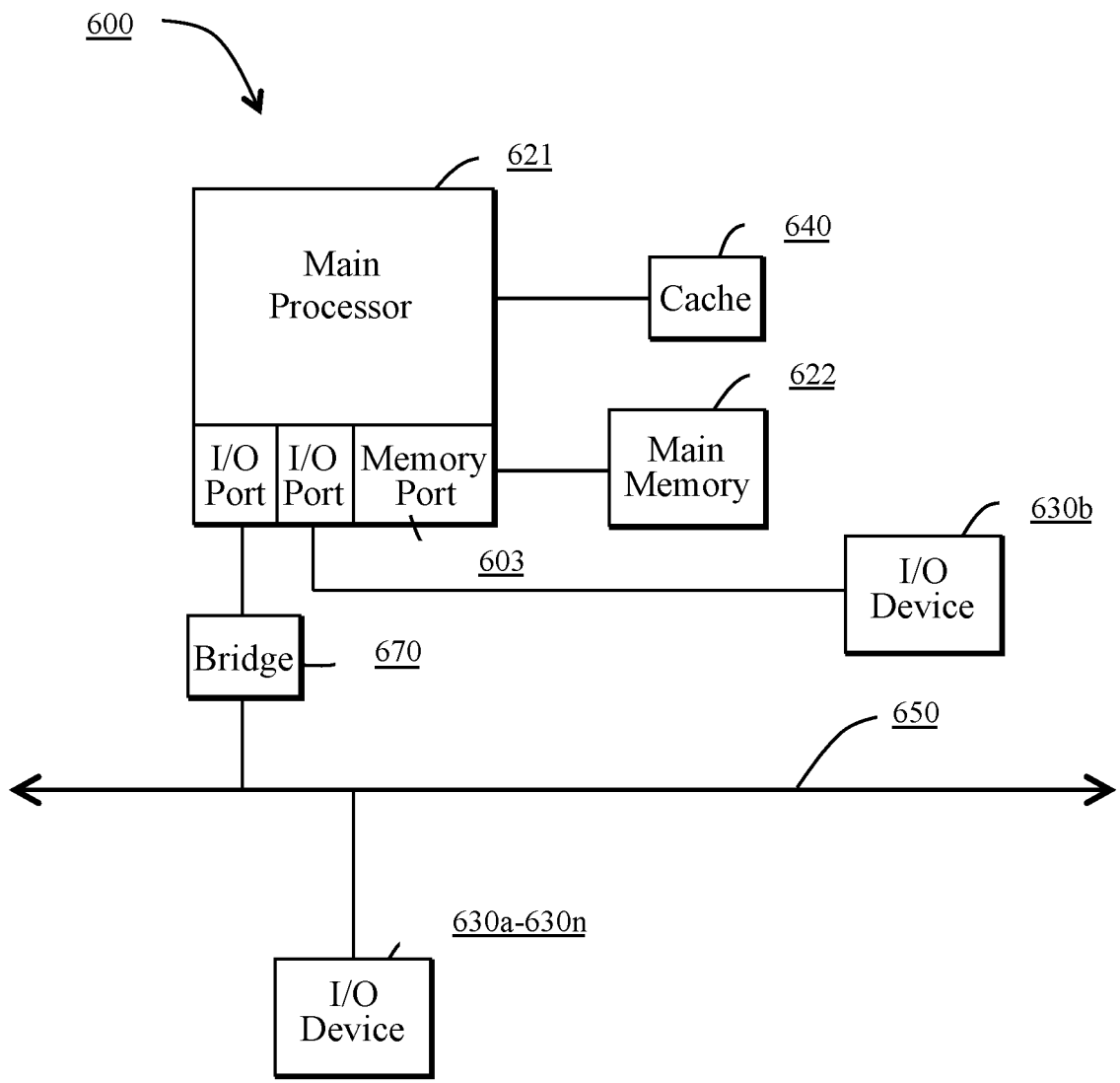

The systems and methods discussed above may be deployed as and/or executed on any type and form of computing device, such as a computer, network device or appliance capable of communicating on any type and form of network and performing the operations described herein. FIGS. 6A and 6B depict block diagrams of a computing device 600 useful for practicing an embodiment of the systems and methods discussed above. As shown in FIGS. 6A and 6B, each computing device 600 includes a central processing unit 621, and a main memory unit 622. As shown in FIG. 6A, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6B, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621, such as any type or variant of Static random access memory (SRAM), Dynamic random access memory (DRAM), Ferroelectric RAM (FRAM), NAND Flash, NOR Flash and Solid State Drives (SSD). The main memory 622 may be based on any of the above described memory chips, or any other available memory chips capable of operating as described herein. In the embodiment shown in FIG. 6A, the processor 621 communicates with main memory 622 via a system bus 650 (described in more detail below). FIG. 6B depicts an embodiment of a computing device 600 in which the processor communicates directly with main memory 622 via a memory port 603. For example, in FIG. 6B the main memory 622 may be DRDRAM.

FIG. 6B depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is provided by, for example, SRAM, BSRAM, or EDRAM. In the embodiment shown in FIG. 6B, the processor 621 communicates with various I/O devices 630 via a local system bus 650. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6B depicts an embodiment of a computer 600 in which the main processor 621 may communicate directly with I/O device 630b, for example via HYPERTRANSPORT, RAPIDIO, or INFINIBAND communications technology. FIG. 6B also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 623 as shown in FIG. 6A. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices such as the USB Flash Drive line of devices manufactured by Twintech Industry, Inc. of Los Alamitos, Calif.

Referring again to FIG. 6A, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to one or more networks through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

In some embodiments, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some embodiments, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6A and 6B may operate under the control of an operating system, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some embodiments, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for in-application dynamic content loading, comprising:
executing, by a computing device, an application comprising a browser application and a content handler;
intercepting, by the content handler, a first request from the browser application to retrieve an item of content via a uniform resource locator (URL) having a domain portion and a directory portion, responsive to the first request having a first predetermined URL scheme;

determining, by the content handler, that a content item does not exist at a location in memory of the computing device corresponding to the directory portion of the URL;

replacing, by the content handler, the first predetermined URL scheme in the first request from the browser application with a second predetermined URL scheme, responsive to the determination that the content item does not exist at the location in memory of the computing device corresponding to the directory portion of the URL;

transmitting, by the computing device, a second request to a remote device corresponding to the domain portion of the first request, the second request comprising the modified first request;

receiving, by the computing device from the remote device, the item of content;

modifying, by the content handler, the item of content to include one or more references having the first predetermined URL scheme to generate a modified item of content; and providing, by the content handler, the modified item of content to the browser application for rendering.

2. The method of claim 1, wherein modifying the item of content comprises:

translating, by the content handler, binary data of the received item of content into a data string;

replacing, by the content handler, each of one or more references to the second predetermined URL scheme within the data string with one or more references to the first predetermined URL scheme to generate a modified data string;

translating, by the content handler, the modified data string into modified binary data for the modified item of content.

3. The method of claim 2, wherein replacing each of the one or more references to the second predetermined URL scheme with the data string further comprises replacing a plurality of references to the second predetermined URL scheme with a respectively plurality of references to the first predetermined URL scheme.

4. The method of claim 2, wherein the item of content comprises executable code.

5. The method of claim 2, wherein providing the modified binary data to the browser application for rendering further comprises generating a response to the first request comprising the modified binary data.

6. The method of claim 1, wherein determining that the content item does not exist at the location in memory of the computing device further comprises determining that the content item is not identified in a manifest of the application.

7. The method of claim 6, further comprising extracting data from a header from the received item of content, and adding the extracted data to the manifest of the application.

8. The method of claim 1, wherein the first predetermined URL scheme is not supported by the browser application or an operating system of the computing device.

9. The method of claim 1, wherein an operating system of the computing device prevents transmission of requests from the application having the second predetermined URL scheme, responsive to transmission of the first request having the first predetermined URL scheme.

10. The method of claim 1, wherein determining that the content item does not exist at the location in memory of the computing device further comprises identifying a type of the content item; and determining that a manifest of the application does not identify the type of the content item.

11. A system for in-application dynamic content loading, comprising:

a computing device comprising a processor, a network interface, and a memory device, the processor executing an application comprising a browser application and a content handler;

wherein the content handler is configured to:
intercept a first request from the browser application to retrieve an item of content via a uniform resource locator (URL) having a domain portion and a directory portion, responsive to the first request having a first predetermined URL scheme, determine that a content item does not exist at a location in the memory device corresponding to the directory portion of the URL, and replace the first predetermined URL scheme in the first request from the browser application with a second predetermined URL scheme, responsive to the determination that the content item does not exist at the location in the memory device corresponding to the directory portion of the URL;

wherein the network interface is configured to:
transmit a second request to a remote device corresponding to the domain portion of the first request, the second request comprising the modified first request, and receive, from the remote device, the item of content; and wherein the content handler is further configured to:
modify the item of content to include references having the first predetermined URL scheme to generate a modified item of content, and provide the modified item of content to the browser application for rendering.

12. The system of claim 11, wherein to modify the item of content, the content handler is further configured to:

translate binary data of the received item of content into a data string;

replace each of one or more references to the second predetermined URL scheme within the data string with one or more references to the first predetermined URL scheme to generate a modified data string;

translate the modified data string into modified binary data for the modified item of content.

13. The system of claim 12, wherein the content handler is further configured to replace a plurality of references to the second predetermined URL scheme with a respective plurality of references to the first predetermined URL scheme.

14. The system of claim 12, wherein the item of content comprises executable code.

15. The system of claim 12, wherein the content handler is further configured to generate a response to the first request comprising the modified binary data.

16. The system of claim 11, wherein the content handler is further configured to determine that the content item is not identified in a manifest of the application.

17. The system of claim 16, wherein the content handler is further configured to extract data from a header from the received item of content, and add the extracted data to the manifest of the application.

18. The system of claim 11, wherein the first predetermined URL scheme is not supported by the browser application or an operating system of the computing device.

19. The system of claim 11, wherein an operating system of the computing device prevents transmission of requests from the application having the second predetermined URL scheme, responsive to transmission of the first request having the first predetermined URL scheme.

20. The system of claim 11, wherein the content handler is further configured to identify a type of the content item; and determine that a manifest of the application does not identify the type of the content item.

* * * * *